Dec. 8, 1959 F. L. PUTZRATH 2,916,709

ELECTRICAL DELAY LINE

Filed April 15, 1955 5 Sheets-Sheet 1

INVENTOR.
FRANZ L. PUTZRATH
BY J. L. Whittaker
ATTORNEY

INVENTOR.
FRANZ L. PUTZRATH
BY J. L. Whittaker
ATTORNEY

INVENTOR.
FRANZ L. PUTZRATH
BY J L Whittaker
ATTORNEY

Dec. 8, 1959 F. L. PUTZRATH 2,916,709

ELECTRICAL DELAY LINE

Filed April 15, 1955 5 Sheets-Sheet 4

INVENTOR.
FRANZ L. PUTZRATH
BY J. L. Whittaker
ATTORNEY

Dec. 8, 1959 F. L. PUTZRATH 2,916,709

ELECTRICAL DELAY LINE

Filed April 15, 1955 5 Sheets-Sheet 5

INVENTOR.
FRANZ L. PUTZRATH
BY
J. L. Whittaker
ATTORNEY

United States Patent Office 2,916,709

Patented Dec. 8, 1959

2,916,709

ELECTRICAL DELAY LINE

Franz L. Putzrath, Oaklyn, N.J., assignor to Radio Corporation of America, a corporation of Delaware Application April 15, 1955, Serial No. 501,566

8 Claims. (Cl. 333—29)

The present invention relates to an improved variable delay line and in particular to an improved arrangement for properly terminating a variable time delay line over the entire range of its time delay variation.

Delay lines are known which introduce time delays, the magnitudes of which are dependent upon the amplitude of an electronic control signal applied to the line. Such lines are useful in general in any application where it is desired to vary the time delay introduced to an electrical signal being transmitted over the delay line. In particular, such lines have important applications in video recording systems where rapid control of the delay introduced to an electrical signal is required in order to compensate for "flutter," that is, minute variations in the time such an electrical signal is received at a given point. Some lines of this type include inductive elements, the inductances of which vary in accordance with the current through saturating windings associated with the elements. Other such lines include capacitive elements which are sensitive to voltages applied to the plates of the elements to vary the capacitance of the elements or, alternatively, electron tubes as simulated variable capacitive elements. In delay lines of the above type, when the line inductance or capacitance changes, the line characteristic impedance also changes. This tends to introduce reflections from the ends of a line terminated in a fixed impedance.

It is a general object of the present invention to provide, in an electronically controlled time delay line, an improved terminating arrangement which maintains the line properly terminated over its entire time delay range.

It is another object of the present invention to provide an improved time delay line termination which is simple and reliable and requires no electron tubes.

The time delay line of the invention is terminated by a resistor of fixed value that is preferably substantially equal to the mean impedance of the delay line. One would expect this termination to reflect wave energy whenever the line impedance was different than that of the resistor. This is prevented according to the invention by coupling the resistor to the delay line with a variable, tapered impedance line that tapers in impedance from a value close to that of the time delay line to a value close to that of said resistor over the entire time delay variation range of the time delay line. In a typical form of the invention, a termination such as described above is employed at both ends of the time delay line. The signal to be delayed may be applied at one end of the time delay line thus terminated or at the center thereof. The latter embodiment is advantageous in that the time delay line is balanced with respect to the source of the signal to be delayed.

The invention will be described in greater detail by reference to the following description taken in connection with the accompanying drawings in which:

Figure 1 is a block circuit diagram of the present invention;

Figure 1*a* is a block circuit diagram showing in modified form a portion of the circuit shown in Figure 1;

Throughout the figures similar reference numerals refer to similar elements.

Figure 1:
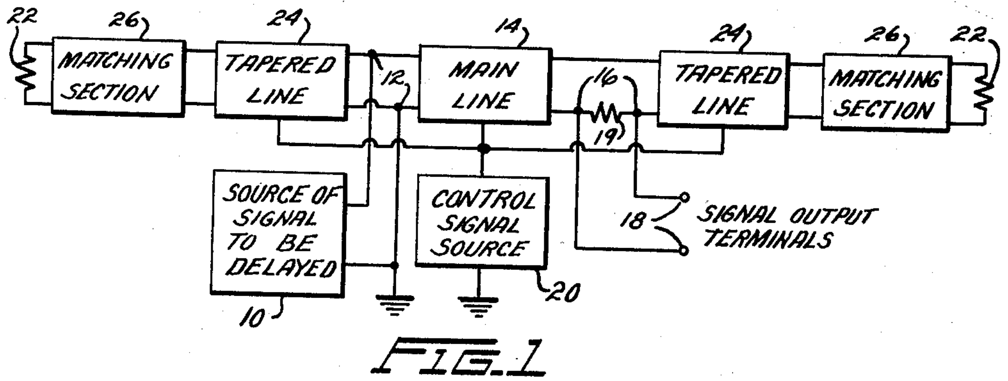
Figure 1A:
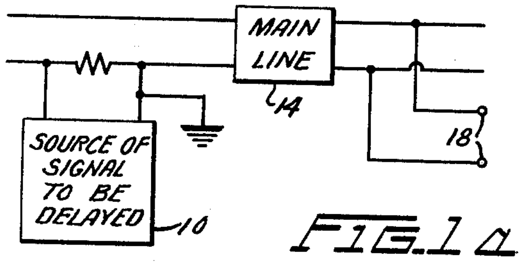

Referring now to Figure 1, a source 10 that provides signals to be time delayed is connected to the input terminals 12 of an electronically controllable time delay line 14. In the drawing the time delay line is designated as main line. The source 10 may be magnetic reproducing apparatus for generating video signals in response to video signals recorded on a magnetic tape. Details of various time delay lines will be given below in connection with the schematic diagrams which follow. After being time delayed, the output signal is available at the signal output terminals 18. The amount of time delay provided by the line 14 is controlled by a control signal from a control signal source 20 which varies the effective capacitance or inductance of the line 14. The source 10 may provide constant current signals, in which case output signals may be derived at the signal output terminals 18 by inserting a small series resistor 19 at the terminals 16 in series with the ground lead on the line as shown in Figure 1. On the other hand, if the source 10 provides constant voltage signals, the output terminals 18 are at high impedance across the line. The latter arrangement is shown in Figure 1*a*.

The present invention is concerned with the means for terminating the time delay line 14 to avoid reflections from the respective sending and receiving ends of the line 14. These reflections are, of course, undesirable and would result in distortions of the delayed signal. The sending and receiving end terminations are identical and the same reference numerals are applied to each. Each termination includes a lumped resistor element 22 having a value which is equal to the mean characteristic resistance of the main line 14. Coupled between this resistor and the main line 14 is an electronically controllable tapered impedance line 24 which has an impedance at the end thereof adjacent the main line 14 which is substantially eqaul to the impedance of the main line 14 and which has an impedance at the end thereof adjacent the lumped resistor 22 which is substantially equal to that of the resistor. A matching section 26 is coupled between the tapered line 24 and the resistor 22. This section 26 is relatively broad banded and matches the impedance of the last section of tapered impedance line 24 to that of the terminating resistor 22 over the entire impedance range of the tapered line 24.

Figure 2:
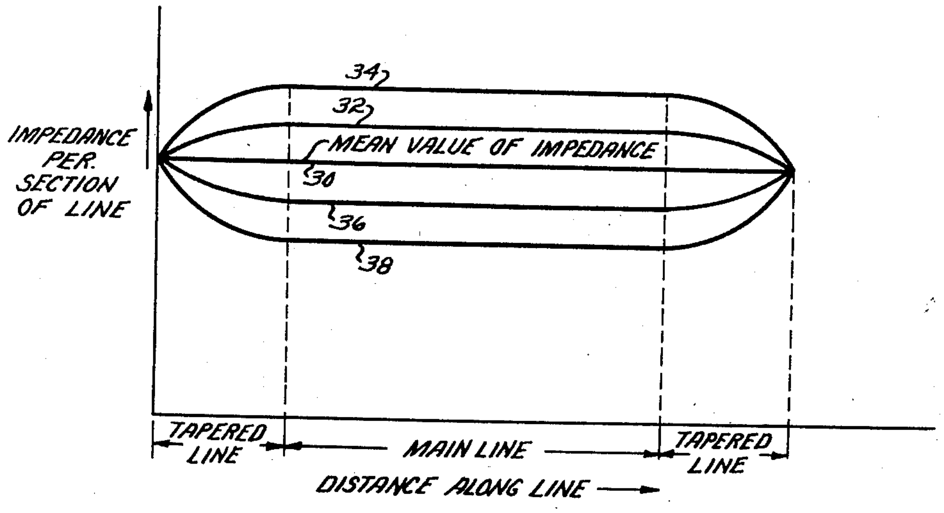
Figure 2 is a graph of the performance of the circuit shown in Figure 1.

Figure 2 is a plot of the characteristic impedance per section of line versus the distance along the line. The resistors 22 at the ends of the line have a value of impedance equal to the mean value of impedance of the main line 14 as shown by line 30. Lines 32, 34, 36 and 38 are plots of the impedances of the main line 14 and tapered lines 24 for four different discrete values of control voltage applied to the main line 14. The upper line 34 corresponds to the maximum value of control voltage and the lower line 38 corresponds to the minimum value of control voltage for the case of varying capacitance, or the upper line 34 corresponds to the minimum control current and the lower line 38 corresponds to the maximum control current for the case of varying inductance. In each case, it will be seen that the impedance of the tapered lines 24, which, it will be remembered, is also electronically controlled, varies from a value substantially equal to that of the main line 14 at the end of the tapered line 24 adjacent the main line 14 to a value substantially equal to that of the terminating resistor 22 at the end thereof adjacent to the terminating resistor 22.

Figure 3:
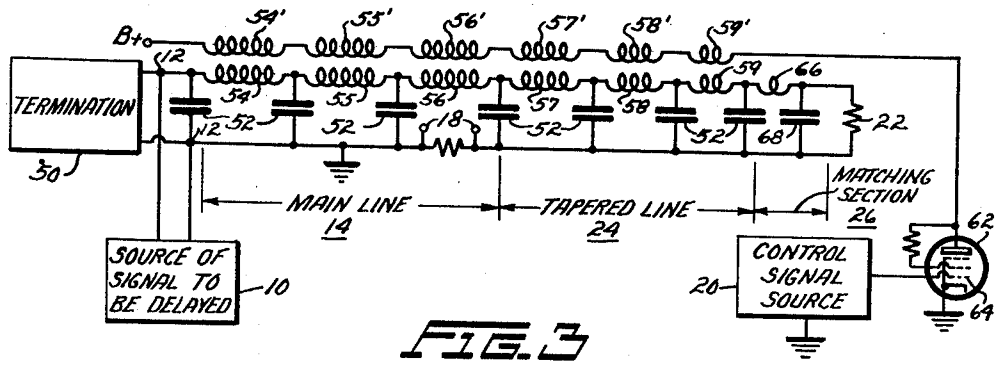
Figure 3 is a schematic circuit diagram of one embodiment of the invention.
Figure 4:
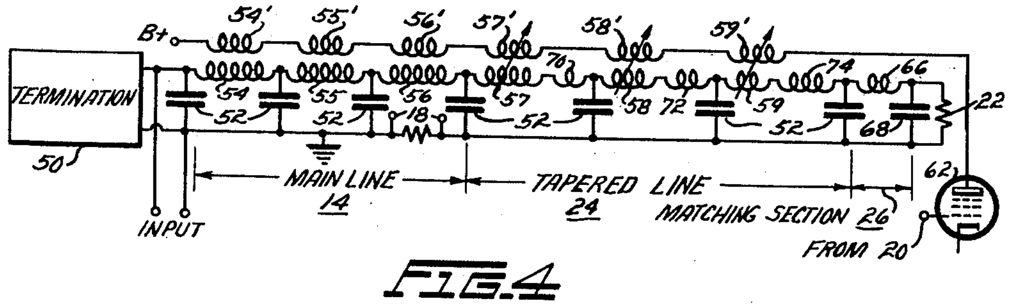
Figure 4 is a schematic circuit diagram of a second embodiment of the invention.
Figure 5:
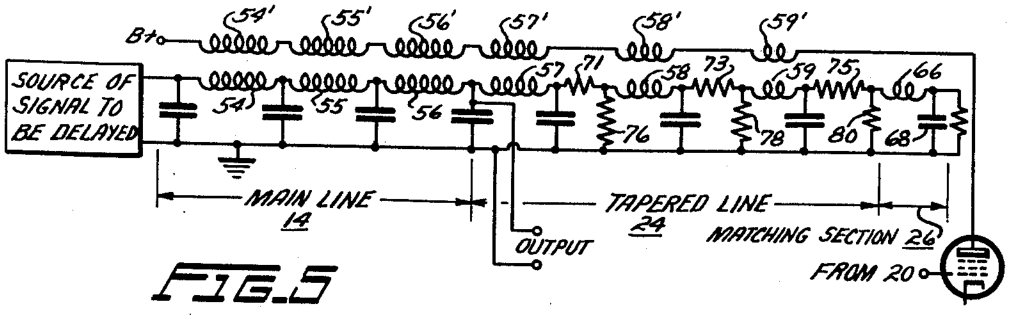
Figure 5 is a schematic circuit diagram of a third embodiment of the invention.

Figures 3, 4 and 5 illustrate specific examples of electronically controlled time delay lines and tapered lines where the variable elements of the lines are the lumped inductive elements of the line.

Referring now to Figure 3, the main time delay line 14 is terminated at its sending end by a termination 50. This termination 50 includes the blocks 22, 24 and 26 shown to the left of the main line 14 in Figure 1. The main and tapered lines 14 and 24 shown in Figure 3 are formed with lumped capacitive elements 52 and electronically controllable inductive elements 54–59 respectively. The inductive elements 54, 55 and 56 of the main line 14 are all of the same value whereas inductive elements 57, 58 and 59 of the tapered line are of successively decreasing value in the order named. This is illustrated schematically by showing the last-named inductor elements as having successively fewer turns. It will be understood, of course, that although only three sections are shown for the tapered and main lines, respectively, in practical embodiments of the invention each may include many more sections. The number of sections in the main line 14 determines the time delay introduced by the line. The number of sections in the tapered line 24 is a function of the extent of delay variation possible in the main line 14 as well as the amount of reflection permissible from this tapered line 24. Thus, if the main line 14 is operative over a comparatively large range of time delays, the tapered line 24 should have more sections, whereas if the main line 14 is operative over a more limited range of time delays, the tapered line 24 may have fewer sections.

The effective inductance of inductors 54–59 is controlled by saturating windings 54′–59′ respectively connected in series circuit with the anode of a pentode tube 62. The amount of current passing through the windings is a function of the amplitude of the signal from control signal source 20 applied to the control grid 64 of the pentode.

As in the case of the inductive elements of the main and tapered lines, the saturating windings 54′, 55′ and 56′ associated with the main line 14 are of the same value, whereas the saturating windings 57′, 58′ and 59′ associated with the tapered line 24 are of successively decreasing value.

In operation, as the characteristic impedance of the main line 14 varies, the impedance of the successive sections of tapered line 24 also vary. The section of tapered line 24 closest to the main line 14 always has a value of impedance close to that of the main line. The impedance of successive sections of the tapered line 24 gradually tapers to that of the section which is adjacent to the matching section 26. This matching section 26 always has a value of impedance close to that of the terminating resistor 22. The matching section 26 includes a coil 66 and a condenser 68, and matches the impedance of the last section of the tapered line 24 to that of the terminating resistor 22 over the entire range of impedance variation of the last section of the tapered line.

The embodiment of Figure 4 is a variation of the one shown in Figure 3. In this embodiment, the saturating current applied to windings 54′–59′ is the same for all windings. Tapered line windings 57, 58 and 59 are of successively smaller inductance somewhat similar to the embodiment of Figure 3. In order to modify the total inductance between capacitors, however, fixed coils 70, 72, and 74 are inserted in series with coils 57, 58 and 59 respectively. Coils 70, 72 and 74 are of successively greater numbers of turns as shown in schematic form in the figure.

Figure 5 illustrates an embodiment identical with the one shown in Figure 3 except for the inclusion of series resistive elements 71, 73 and 75 and shunt resistive elements 76, 78 and 80. The ratio of resistor 71 to resistor 76 is less than that of resistor 73 to resistor 78, which in turn is less than that of resistor 75 to resistor 80. These resistive elements help to minimize reflections from the tapered line 24 for a given tapered line length. Alternatively, the inclusion of such elements permits a more rapid tapering of the line and so permits the use of a shorter line. The insertion of resistive elements is, of course, also applicable to the embodiment of Figure 4.

Figures 6, 7, 8:
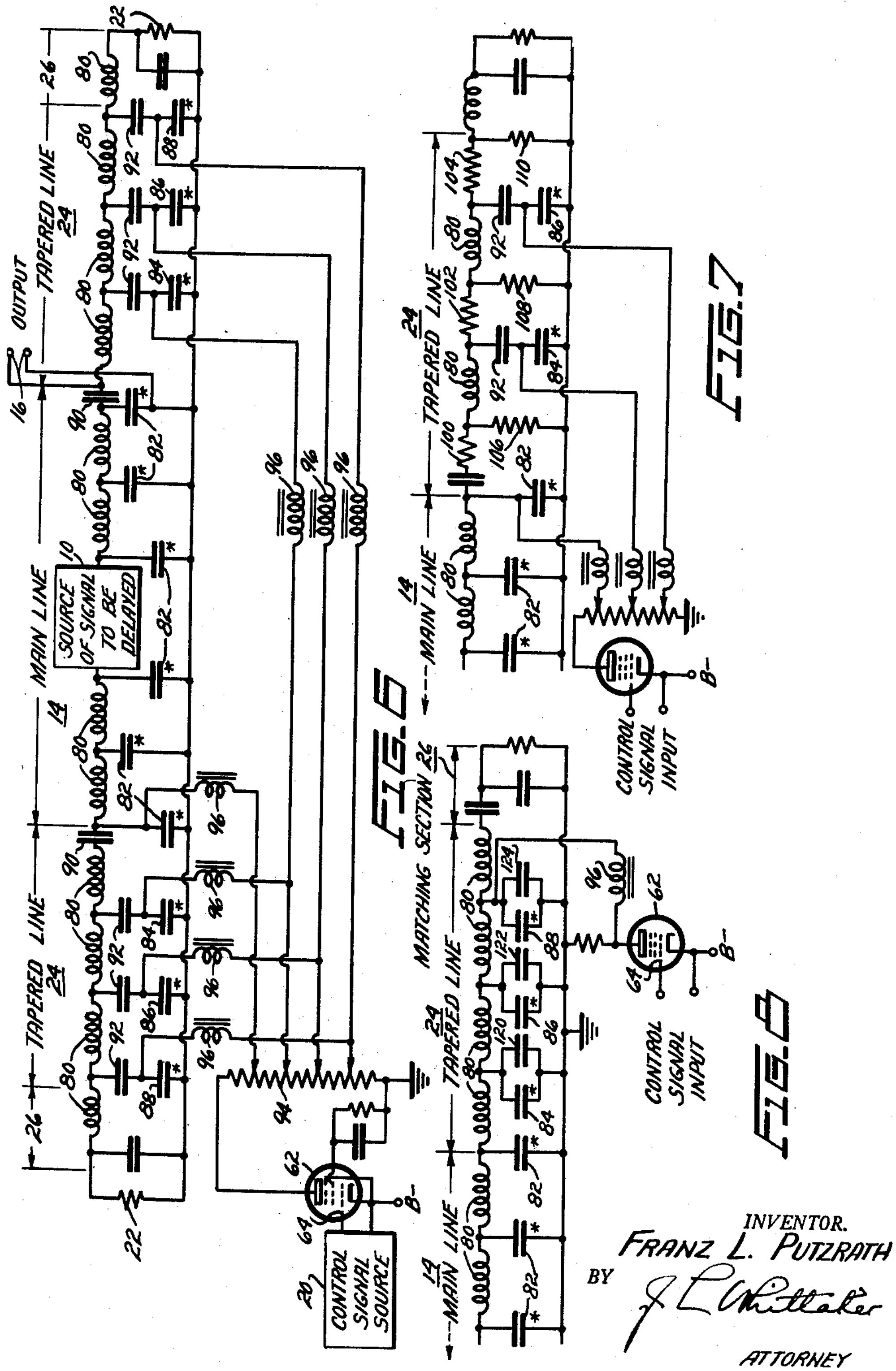
Figure 6 is a schematic circuit diagram of a fourth embodiment of the invention.
Figure 7 is a schematic circuit diagram of a fifth embodiment of the invention.
Figure 8 is a schematic circuit diagram of a sixth embodiment of the invention.

Figures 6, 7 and 8 illustrate delay lines wherein the capacitors are the variable elements. In order to distinguish the electronically variable capacitors from conventional capacitors, there is applied to each of the former an asterisk beneath the lower plate. Electronically controllable capacitors per se which have incremental dielectric constants which are a function of the direct voltage applied to the capacitors are well known and need not be described in further detail.

Referring now to Figure 6, the main time delay line 14 and the tapered lines 24 include inductive elements 80 which are all of the same value. The main line 14 further includes electronically controllable capacitive elements 82 which are also of the same value. The tapered lines 24 are formed with electronically controllable capacitive elements 84, 86 and 88 which are of successively smaller capacitances in the order named. Coupling capacitors 90 serve to prevent the control voltage applied to the main line 14 from appearing on the tapered lines 24. Likewise, the coupling capacitors 92 serve to isolate the control voltages applied to the electronically controllable capacitive elements of the tapered lines 24.

As in embodiments of Figures 3–5, the magnitude of a control signal from source 20 applied to the control grid 64 of a pentode 62 determines the delay introduced by the main line 14 and the amount of taper of the tapered lines 24. The output of the pentode is taken from a voltage dividing network 94, the control voltage of largest amplitude being applied to the capacitors of the main line 14 and successively smaller amplitudes of control voltage being applied to the successive capacitors of the tapered lines 24. Radio frequency choke coils 96 serve to isolate the control voltage from the signals being delayed.

Figure 9:
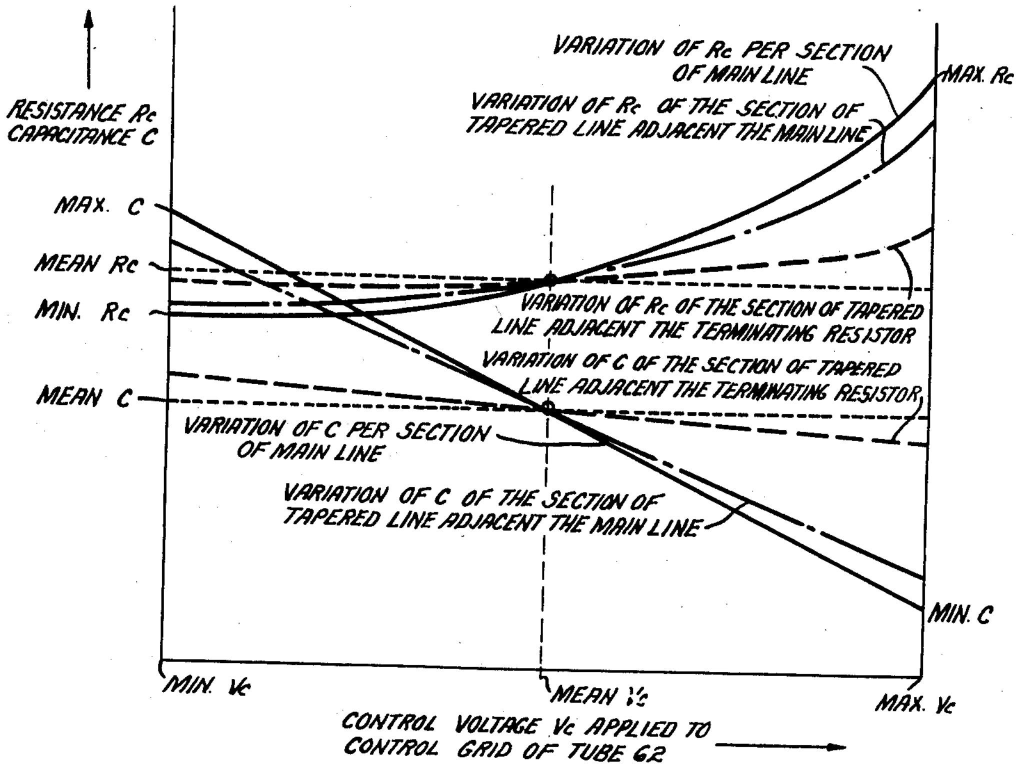
Figure 9 is a graph showing certain of the performance characteristics of the embodiments of the invention shown in Figures 6, 7 and 8.

The performance of the line of Figure 6 and also of the other lines illustrated may be readily understood by reference to Figure 9. The solid lines in Figure 9 are the characteristic impedance and capacitance respectively of the main line 14; the dashed lines represent the characteristic impedance and capacitance respectively of the section of the tapered lines 24 adjacent to the terminating resistor 22; and the dot-dashed lines represent the characteristic impedance and capacitance respectively of the section of tapered lines 24 adjacent to the main line 14. It will be noted from Figure 9 that maximum capacitance is equivalent to minimum impedance. This follows from the equation $R_c=\sqrt{L/C}$, where $R_c$ is the characteristic impedance of the line and L and C are the inductance and capacitance of a section of the line respectively. The slope of the resistance curve of the section of tapered lines 24 immediately adjacent to the main line 14 is different from that of the main line. However, both curves intersect at the mean value of the resistance of the main and tapered lines. In the same manner, the resistance curve for the section of tapered lines 24 adjacent to the terminating resistor 22 also intersects the main line resistance curve at the mean control voltage value. The impedance of the section of tapered lines 24 adjacent to the terminating resistance is always relatively close to that of the terminating resistance, and the resistance of the section of tapered lines 24 adjacent the main line 14 is always close to that of the main line. Intermediate these two curves are pluralities of other curves (not shown), one for each line section of the tapered lines 24. The overall arrangement provides a smooth transition from the main line impedance, whatever it may be, to the fixed value of terminating resistance.

In the illustration C is shown as a linear function of the control voltage $V_c$ whereby $R_c$ varies in accordance with $1/\sqrt{C}$. It is to be understood that the graph of Figure 9 is meant to illustrate one mode of operation only as the capacitance may be designed to vary nonlinearly with $V_c$, if desired. In each case $R_c$ is a function of $1/\sqrt{C}$.

In the embodiment of Figure 6 the signal to be delayed is applied by source 10 to the main line at the center of the line. This is advantageous in that the entire delay line system is balanced with respect to source 10. This method of signal application is also applicable to the embodiments of Figures 3, 4, 5, 7 and 8.

The embodiment of Figure 7 is similar to the one shown in Figure 6 except that the former includes series and shunt resistive elements in the tapered line 24. The series resistor elements 100, 102 and 104 are of ever increasing value, and the shunt resistor elements 106, 108 and 110 are of ever decreasing value. As in the embodiment of Figure 5, the resistors serve to minimize reflections from the tapered line 24 for a given tapered line length, or, provide, with a shorted tapered line length, performance equivalent to that of longer tapered lines without resistors.

The embodiment of Figure 8 is analogous to the capacitively controlled line shown in Figure 6. In Figure 8, the same control voltage is applied to all electronically controllable capacitor elments. As in the embodiment of Figure 6, the capacitors 84, 86 and 88 of the tapered lines 24 are of successively smaller value. Fixed capacitors 120, 122 and 124 in shunt with the capacitors 84, 86 and 88 respectively are employed. These fixed capacitors modify the effective voltage coefficient for each of the capacitor sections in order to obtain the type of performance illustrated in Figure 9.

Figure 10:
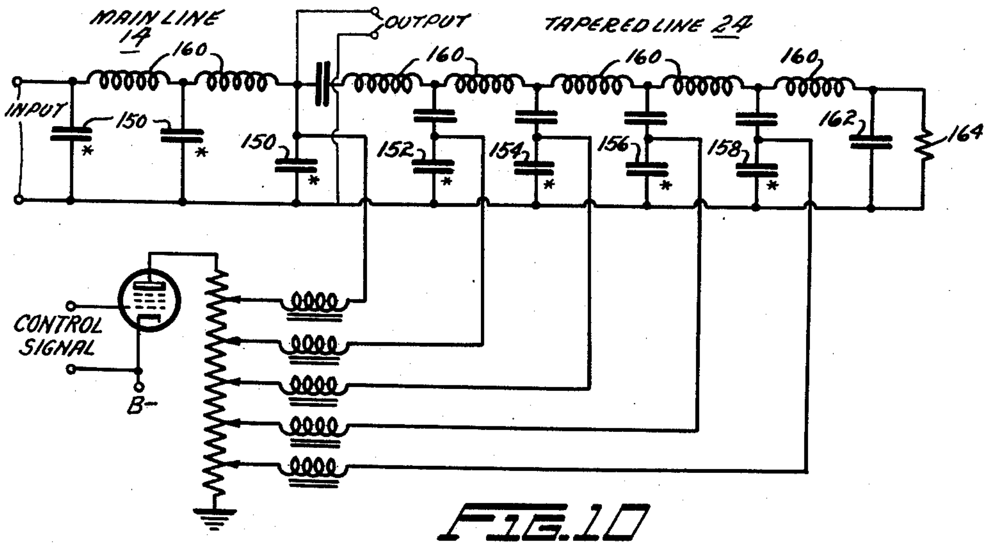
Figure 10 is a schematic circuit diagram of an embodiment of the invention similar to the one shown in Figure 6.

Figure 10 illustrates a portion of a delay line wherein the capacitors 150 are in the main line 14 and the capacitors 152, 154, 156, 158 and 162 are in the tapered line 24. In a line designed for operation in the 16 kc. (kilocycle) to 300 kc. region, typical values of fixed circuit components are: resistor 164–1000 ohms; coils 160–100 microhenries. The time delay per section of such a delay line varies from 0.079 $\mu$s. (microseconds) per section to 0.127 $\mu$s. per section with corresponding impedance variations of from 1270 ohms per section to 780 ohms per section. The following table gives the values of the electronically controlled capacitors as functions of the line delay per section for given discrete delay values.

| | | | *Mean Value* | | |
|---|---|---|---|---|---|
| Delay Per Section in $\mu$s | .079 | .089 | 0.10 | 0.113 | 0.127 |
| Impedance Per Section in ohms | 1,270 | 1,120 | 1,000 | 890 | 780 |
| | Capacitance in Micromicrofarads | | | | |
| Capacitor number: | | | | | |
| 162 | 100 | 100 | 100 | 100 | 100 |
| 158 | 91 | 96 | 100 | 105 | 110 |
| 156 | 83 | 91 | 100 | 110 | 121 |
| 154 | 75 | 87 | 100 | 116 | 133 |
| 152 | 69 | 83 | 100 | 122 | 146 |
| 150 | 62 | 79 | 100 | 128 | 161 |

Figure 11:
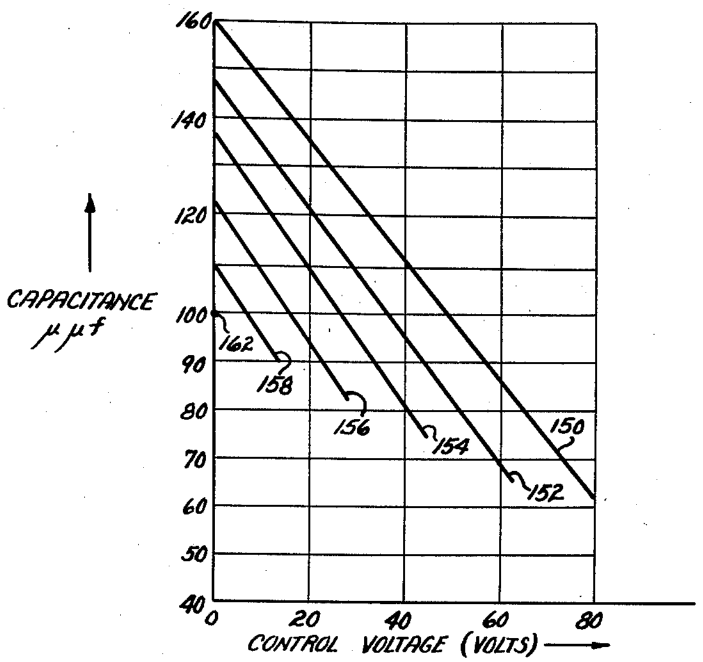
Figure 11 is a graph showing the relation between the capacitance and the voltage applied to the variable capacitors of the embodiment of Figure 10.

Figure 11 shows the capacitance variation versus control voltage variation for the circuit shown in Figure 10. This figure is self-explanatory.

In most of the embodiments of the invention illustrated, the main delay line section is terminated at both the sending and receiving ends in a termination including a tapered line, a matching section and a lumped resistor. This type of termination provides the best performance expecially where the main lines are relatively long. In many applications, however, where the main lines are relatively short, it is merely necessary to terminate the main line at its receiving end. Such an arrangement is illustrated in Figure 5 and, of course, is applicable to the embodiments shown in the other figures.

What is claimed is:

1. An electrical delay line having an impedance and a time delay that are variable as a function of a line impedance controlling signal applied to said delay line, terminating impedance means for said electrical delay line, a tapered impedance line coupled between said terminating impedance means and said electrical delay line, said tapered impedance delay line having an impedance at the one end thereof coupled to one end of said electrical delay line, which impedance is substantially equal to the impedance of the electrical delay line, said tapered line having an impedance at the other end thereof coupled to said terminating impedance means that is substantially equal to the impedance of said terminating impedance means, the impedance of said tapered line being variable as a function of a control signal applied to said tapered line, and means for applying a control signal to said electrical delay line and to said tapered impedance line so that as the impedance of the electrical delay line is varied the impedance of said tapered line continuously substantially matches the electrical delay line impedance to the terminating impedance means.

2. An electrical delay line having an impedance and a time delay that are variable as a function of a control signal applied to said delay line to control its impedance, impedance terminating means for said delay line, a tapered impedance line having an impedance at one end that is substantially equal to the impedance of said impedance terminating means and an impedance at the other end that is substantially equal to the impedance of said electrical delay line and that is variable as a function of said control signal applied to said tapered line, means coupling said one end of said tapered line to said terminating means, means coupling said other end of said tapered line to one end of said relay line, and means for applying a control signal to said electrical delay line and to said tapered impedance line simultaneously, whereby the impedance of said delay line is substantially matched continuously to said impedance terminating means as the impedance of said delay line is varied.

3. In a variable electrical delay line having an impedance and a time delay which varies in response to a control signal applied to said variable delay line to vary its impedance in accordance with the control potential, the combination of resistor means for terminating said variable delay line, an impedance matching section coupled between said resistor means and an end of said variable delay line and including a variable, tapered impedance delay line responsive to said control signal and having an impedance which tapers from a value substantially equal to that of said delay line at the end of said tapered line coupled to said variable delay line to a value substantially equal to that of said resistor means at the other end of said tapered line, said tapered impedance line including inductor elements whose inductances are controllable, and a source of control potential coupled to said variable electrical delay line and to said inductor elements for varying the delay line impedance and the tapered impedance delay line inductor elements simultaneously, so that as the impedance of the electrical delay line is varied the impedance of the tapered impedance delay line continuously substantially matches the electrical delay line to the impedance of said resistor means.

4. In an electrical delay line having an impedance and a time delay which varies in response to an impedance controlling signal applied to said electrical delay line, the combination of a resistor for terminating said electrical delay line to avoid reflections from one end of said electrical delay line, said resistor having a value substantially equal to the mean characteristic impedance of said electrical delay line, a tapered impedance delay line coupled between said resistor and said one end of said electrical delay line, said tapered impedance delay line including series inductor elements whose inductances are controllable, said tapered impedance line having an impedance which varies in response to a control signal and which tapers from a value substantially equal to that of said electrical delay line at the end of said tapered impedance line coupled to said one end of said electrical delay line to a value substantially equal to that of said resistor at the end of said tapered impedance line coupled to said resistor, means for applying a control potential to said electrical delay line, and means for simultaneously applying said control potential to the inductor elements of said tapered impedance line so that as the impedance of the electrical delay line is varied the impedance of the tapered line continuously substantially matches the electrical delay line impedance to the impedance of said terminating resistor.

5. In a variable electrical delay line having an impedance and a time delay which vary in response to a control signal applied to said delay line to vary its impedance, the combination of impedance means for terminating said delay line to avoid reflections in said delay line, said terminating impedance means comprising resistor means having a value substantially equal to the mean characteristic impedance of said delay line, an impedance matching section coupled between said resistor means and one end of said delay line and including a variable tapered impedance delay line formed with shunt controllable capacitive means, said capacitive means being responsive to said control signal for tapering the impedance of said tapered impedance delay line from a value substantially equal to that of said delay line at the end of said tapered line coupled to said delay line to a value substantially equal to that of said resistor means at the other end of said tapered line coupled to said resistor means, and means for applying control signals to said delay line and said controllable capacitive means simultaneously so that as the impedance of the electrical delay line is varied the impedance of the tapered line continuously substantially matches the electrical delay line to the terminating impedance means.

6. In a variable electrical delay line having an impedance and a time delay which varies as a function of a control signal applied to said electrical delay line to vary its impedance, the combination of resistor means for terminating said electrical delay line, an impedance matching section coupled between said resistor means and an end of said electrical delay line and including a variable, tapered impedance delay line responsive to said control signal and having an impedance which tapers from a value substantially equal to that of said electrical delay line at one end of said tapered line coupled to said electrical delay line to a value substantially equal to that of said resistor means at the other end of said tapered line coupled to said resistor means, said variable electrical delay line and said tapered impedance delay line each including controllable capacitor elements and a source of control signal coupled to the capacitor elements of said electrical delay line and of said tapered impedance delay line so that as the impedance of the variable electrical delay line is varied the tapered line continuously substantially matches the impedance of said end of said electrical delay line to the impedance of said resistor means.

7. The combination as recited in claim 4 wherein said inductor elements in said tapered line have successively smaller magnitudes in the direction of the said other end of said tapered line.

8. The combination as recited in claim 3 wherein said inductor elements in said tapered line are in series and wherein said tapered line includes one or more shunt capacitor elements and wherein output terminals are connected across one of said capacitor elements.

References Cited in the file of this patent

UNITED STATES PATENTS

| | | |
|---|---|---|
| 2,024,234 | Kunze | Dec. 17, 1935 |
| 2,151,118 | King et al. | Mar. 21, 1939 |
| 2,456,800 | Taylor | Dec. 21, 1948 |
| 2,515,436 | Babin | July 18, 1950 |
| 2,559,905 | Turner | July 10, 1951 |
| 2,565,231 | Hepp | Aug. 21, 1951 |
| 2,607,031 | Denis et al. | Aug. 12, 1952 |
| 2,608,654 | Street | Aug. 26, 1952 |
| 2,650,350 | Heath | Aug. 25, 1953 |
| 2,700,114 | Blythe | Jan. 18, 1955 |
| 2,778,887 | Bradley | Jan. 22, 1957 |